United States Patent
Song (10) Patent No.: US 10,844,723 B2
(45) Date of Patent: Nov. 24, 2020

(54) VANE ASSEMBLY, TURBINE INCLUDING VANE ASSEMBLY, AND GASTURBINE INCLUDING VANE ASSEMBLY

(71) Applicant: DOOSAN HEAVY INDUSTRIES & CONSTRUCTION CO., LTD., Changwon-si (KR)

(72) Inventor: Jin Woo Song, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 157 days.

(21) Appl. No.: 16/115,543

(22) Filed: Aug. 28, 2018

(65) Prior Publication Data

US 2020/0024952 A1    Jan. 23, 2020

(30) Foreign Application Priority Data

Sep. 12, 2017   (KR) .................... 10-2017-0116498

(51) Int. Cl.
*F01D 25/24*   (2006.01)
*F01D 9/04*   (2006.01)
(Continued)

(52) U.S. Cl.
CPC .............. *F01D 5/14* (2013.01); *F01D 9/04* (2013.01); *F01D 9/042* (2013.01); *F01D 25/246* (2013.01);
(Continued)

(58) Field of Classification Search
CPC .......... F01D 5/14; F01D 25/246; F01D 25/24; F01D 9/042; F01D 11/001; F02C 7/28;
(Continued)

(56) References Cited

U.S. PATENT DOCUMENTS 3,362,160 A * 1/1968 Bourgeois ............. F01D 21/003
  60/805
3,909,157 A * 9/1975 Wachtell ................. B23P 6/005
  415/208.3
(Continued)

FOREIGN PATENT DOCUMENTS

CA       2712756 A1 * 2/2011
EP       2921652 A4 * 9/2016 ........... F01D 25/246
(Continued)

*Primary Examiner* — Moshe Wilensky
*Assistant Examiner* — Brian Christopher Delrue
(74) *Attorney, Agent, or Firm* — Invenstone Patent, LLC (57) ABSTRACT

Disclosed is a vane assembly fixed to a turbine casing of a turbine and configured to guide the flow of combustion gas having passed by a turbine blade airfoil. The vane assembly comprises a vane airfoil configured to guide the flow of the combustion gas, a platform portion combined with an end of the vane airfoil, carrier hook portions formed at respective periphery portions of the platform portion and provided with a thermal stress prevention slot on a surface facing the turbine casing, and a seal plate installed in the thermal stress prevention slot, thereby preventing a portion of compressed air produced by a compressor and supplied to the platform portion between the carrier hook portions from leaking out of the platform portion through the thermal stress prevention slot.

14 Claims, 3 Drawing Sheets

(51) Int. Cl.
*F01D 5/14* (2006.01)
*F02C 7/28* (2006.01)

(52) U.S. Cl.
CPC ............ *F02C 7/28* (2013.01); *F05D 2220/32* (2013.01); *F05D 2240/55* (2013.01); *F05D 2270/112* (2013.01)

(58) Field of Classification Search
CPC .... F02C 7/20; F05D 2220/32; F05D 2240/55; F05D 2270/112; F05D 2240/12; F05D 2240/14
See application file for complete search history.

(56) References Cited

U.S. PATENT DOCUMENTS

| | | | | |
|---|---|---|---|---|
| 4,639,189 A * | 1/1987 | Rosman | ............... | F01D 9/041 415/115 |
| 4,687,413 A * | 8/1987 | Prario | ............... | F01D 11/08 403/319 |
| 4,720,236 A * | 1/1988 | Stevens | ............... | F01D 9/042 415/116 |
| 4,856,963 A * | 8/1989 | Klapproth | ............... | F01D 9/042 415/190 |
| 4,897,021 A * | 1/1990 | Chaplin | ............... | F01D 5/22 267/160 |
| 5,176,496 A * | 1/1993 | Correia | ............... | F01D 9/042 415/189 |
| 5,248,240 A * | 9/1993 | Correia | ............... | F01D 9/042 415/191 |
| 5,343,694 A * | 9/1994 | Toborg | ............... | F01D 9/042 60/796 |
| 5,846,050 A * | 12/1998 | Schilling | ............... | F01D 9/04 415/135 |
| 6,050,776 A * | 4/2000 | Akagi | ............... | F01D 5/22 415/138 |
| 6,109,873 A * | 8/2000 | Brooks | ............... | F01D 5/147 416/62 |
| 6,273,676 B1 * | 8/2001 | Brooks | ............... | F01D 5/147 415/191 |
| 6,296,443 B1 * | 10/2001 | Newman | ............... | F01D 9/042 415/189 |
| 6,494,677 B1 * | 12/2002 | Grady | ............... | B23P 6/002 29/889.7 |
| 6,575,703 B2 * | 6/2003 | Simeone | ............... | F01D 5/066 416/220 R |
| 6,699,011 B2 * | 3/2004 | Cot | ............... | F01D 9/04 415/173.1 |
| 7,165,772 B1 * | 1/2007 | Camacho | ............... | B64D 13/02 277/496 |
| 7,229,245 B2 * | 6/2007 | Ellis | ............... | F01D 9/041 415/135 |
| 7,258,525 B2 * | 8/2007 | Boeck | ............... | F01D 9/042 415/191 |
| 7,704,042 B2 * | 4/2010 | Brueckner | ............... | F01D 9/042 415/121.3 |
| 8,079,802 B2 * | 12/2011 | Takamura | ............... | F01D 5/085 415/1 |
| 8,092,163 B2 * | 1/2012 | Shapiro | ............... | F01D 9/042 415/189 |
| 8,220,150 B2 * | 7/2012 | Pellet | ............... | B23P 6/002 29/889 |
| RE43,928 E * | 1/2013 | Clouse | ............... | F01D 17/02 415/115 |
| 8,356,981 B2 * | 1/2013 | Cooke | ............... | F01D 9/042 416/214 A |
| 8,376,705 B1 * | 2/2013 | Liang | ............... | F01D 9/04 415/115 |
| 8,684,674 B2 * | 4/2014 | Chan | ............... | F01D 11/001 415/119 |
| 9,683,459 B2 * | 6/2017 | Aoki | ............... | F01D 9/04 |
| 9,752,446 B2 * | 9/2017 | Boeke | ............... | F01D 9/04 |
| 9,759,079 B2 * | 9/2017 | Sippel | ............... | F01D 11/005 |
| 9,803,488 B2 * | 10/2017 | Riley | ............... | F01D 9/041 |
| 9,915,158 B2 * | 3/2018 | Graf | ............... | F01D 9/023 |
| 9,945,237 B2 * | 4/2018 | Partyka | ............... | F01D 5/082 |
| 10,598,021 B2 * | 3/2020 | Kim | ............... | F02C 3/06 |
| 2006/0013685 A1 * | 1/2006 | Ellis | ............... | F01D 9/041 415/210.1 |
| 2006/0078429 A1 * | 4/2006 | Darkins, Jr. | ............... | F01D 9/04 415/209.2 |
| 2006/0291998 A1 * | 12/2006 | Dube | ............... | F01D 17/02 415/118 |
| 2007/0025837 A1 * | 2/2007 | Pezzetti, Jr. | ............... | F01D 11/005 415/115 |
| 2007/0122275 A1 * | 5/2007 | Busch | ............... | F01D 25/246 415/209.3 |
| 2008/0152485 A1 * | 6/2008 | Kammel | ............... | F01D 9/041 415/189 |
| 2009/0246014 A1 * | 10/2009 | Shapiro | ............... | F01D 9/042 415/209.3 |
| 2009/0324386 A1 * | 12/2009 | Takamura | ............... | F01D 5/085 415/115 |
| 2010/0028143 A1 * | 2/2010 | Bailey | ............... | B23P 6/002 415/202 |
| 2010/0068041 A1 * | 3/2010 | Nigmatulin | ............... | F01D 9/04 415/173.1 |
| 2011/0044803 A1 * | 2/2011 | Di Paola | ............... | F01D 9/04 415/173.1 |
| 2012/0163993 A1 * | 6/2012 | Levine | ............... | F01D 9/065 416/97 R |
| 2013/0011265 A1 * | 1/2013 | Miller | ............... | F01D 11/008 416/191 |
| 2013/0108434 A1 * | 5/2013 | Judet | ............... | F01D 9/042 415/208.2 |
| 2013/0115065 A1 * | 5/2013 | Correia | ............... | F01D 11/005 415/182.1 |
| 2013/0202409 A1 * | 8/2013 | Jones | ............... | F01D 5/189 415/115 |
| 2013/0259646 A1 * | 10/2013 | Feindel | ............... | F01D 25/246 415/118 |
| 2013/0287995 A1 * | 10/2013 | Deobald | ............... | B29C 70/30 428/120 |
| 2014/0119902 A1 * | 5/2014 | Feldmann | ............... | F01D 11/08 415/173.1 |
| 2014/0147263 A1 * | 5/2014 | Bergman | ............... | F01D 9/042 415/208.1 |
| 2015/0030443 A1 * | 1/2015 | Richardson | ............... | F01D 5/22 415/210.1 |
| 2015/0098829 A1 * | 4/2015 | Baldiga | ............... | F01D 11/003 416/179 |
| 2015/0226075 A1 * | 8/2015 | Aoki | ............... | F01D 25/246 415/209.3 |
| 2015/0292342 A1 * | 10/2015 | Ring | ............... | F01D 9/041 415/208.2 |
| 2015/0377041 A1 * | 12/2015 | Partyka | ............... | F01D 5/02 60/805 |
| 2016/0153296 A1 * | 6/2016 | Ols | ............... | F01D 5/082 415/1 |
| 2016/0153299 A1 * | 6/2016 | Tuertscher | ............... | F01D 5/14 415/115 |
| 2016/0290147 A1 * | 10/2016 | Weaver | ............... | F02C 3/04 |
| 2016/0312658 A1 * | 10/2016 | Heitman | ............... | F01D 25/28 |
| 2017/0002675 A1 * | 1/2017 | Lutjen | ............... | F01D 9/042 |
| 2017/0370240 A1 * | 12/2017 | Sippel | ............... | F01D 11/005 |
| 2018/0347366 A1 * | 12/2018 | Simonet | ............... | F01D 11/005 |

FOREIGN PATENT DOCUMENTS

| | | | |
|---|---|---|---|
| EP | 2921652 B1 * | 12/2017 | |
| EP | 3409898 A1 * | 12/2018 | ............... F02C 7/28 |
| GB | 2462268 A * | 2/2010 | ............... F01D 25/246 |
| JP | 4781244 B2 | 9/2011 | |

\* cited by examiner

VANE ASSEMBLY, TURBINE INCLUDING VANE ASSEMBLY, AND GASTURBINE INCLUDING VANE ASSEMBLY

CROSS REFERENCE TO RELATED APPLICATION

This application claims the benefit of Korean Patent Application No. 10-2017-0116498, filed on Sep. 12, 2017, in the Korean Intellectual Property Office, the disclosure of which is incorporated herein in its entirety by reference.

BACKGROUND OF THE DISCLOSURE

1. Field of the Disclosure

The present disclosure relates to a vane assembly that guides the flow of high-temperature, high-pressure combustion gas through airfoils of multistage turbine blades as well as a turbine including the vane assembly and a gas turbine including the vane assembly.

2. Description of the Related Art

A turbine is a rotary mechanical device that rotates by an impulse or a reaction force to a flow of compressible fluid, such as gas. Turbines are categorized into steam turbines using steam as the compressible fluid and gas turbines using hot combustion gas as the compressible fluid.

A gas turbine is mainly composed of a compressor section, a combustor section, and a turbine section. The compressor section includes a compressor casing that is provided with an air inlet through which air is introduced. The compressor section further includes multiple compressor vane airfoils and multiple compressor blade airfoils that are arranged to be alternate with each other in the compressor casing.

The combustor mixes fuel with the compressed air generated by the compressor, and ignites the fuel-air mixture with a burner to produce high-temperature high-pressure combustion gas.

The turbine includes a turbine casing in which a plurality of turbine vane airfoils and a plurality of turbine blade airfoils are alternately arranged. A rotor is arranged to extend through the centers of the compressor, the combustor, the turbine, and an exhaust chamber.

The rotor is rotatably supported by bearings at respective ends thereof. The rotor is combined with multiple disks such that the multiple disks are mounted on the rotor, and multiple blade airfoils are attached to each of the multiple disks. An end of the rotor, which is disposed on the exhaust chamber side, is connected to a drive shaft.

This gas turbine does not include a reciprocating mechanism such as a piston, which is usually present in a typical four-stroke engine. Therefore, it has no mutual frictional part such as a piston-cylinder part, thereby consuming an extremely small amount of lubricating oil and reducing the operational movement range, thus resulting in high speed operability.

During the operation of a gas turbine, air is first compressed by a compressor and then mixed with fuel. Then, the fuel-air mixture is burned to produce combustion gas which is then ejected toward a turbine. The ejected combustion gas causes a rotary force while passing between turbine vane airfoils and between turbine blade airfoils so that the rotor of the turbine is rotated by the rotary force.

SUMMARY OF THE DISCLOSURE

In the conventional gas turbine, the turbine vane assembly that guides the flow of combustion gas between the turbine blade airfoils experience a thermal expansion as it is being exposed to the high temperature combustion gas. At this time, thermal stress concentrates on a hook portion of the shroud of the turbine vane and the turbine casing. Therefore, it may be difficult for the casing and the hook portion to be securely fixed due to the thermal expansion.

The present disclosure has been made in view of the above problems occurring in the related art, and an objective of the present disclosure is to provide a vane assembly being capable of preventing thermal stress being concentrated on a hook portion of a shroud of a turbine vane fixed to a turbine casing, a turbine comprising the vane assembly, and a gas turbine comprising the turbine.

According to one aspect of the present disclosure, there is provided a turbine configured to generate driving force to be used for generation of electric power by allowing a combustion gas supplied from a combustor to pass therethrough, the turbine comprising: a turbine section comprising a plurality of turbine rotor disks and a plurality of turbine blade airfoils coupled to an outer surface of each of the plurality of turbine rotor disks; a turbine casing accommodating the turbine section; and a plurality of vane assemblies provided inside the turbine casing and arranged between the turbine blade airfoils, wherein each of the turbine vane assemblies comprises a vane airfoil configured to guide a flow direction of the combustion gas, a platform portion combined with an end of the vane airfoil, carrier hook portions provided at respective periphery portions of the platform portion and arranged to face the turbine casing so as to be fixed to the turbine casing, and a seal plate installed in a thermal stress prevention slot provided to the carrier hook portion facing the turbine casing, thereby preventing a portion of compressed air supplied to the platform portion between the carrier hook portions by a compressor from leaking to an outside of the platform portion through the thermal stress prevention slot.

According to another aspect of the present disclosure, there is provided a gas turbine comprising: a compressor taking in air and compressing the intake air; a combustor burning fuel by using compressed air supplied from the compressor to produce combustion gas; and a turbine comprising a turbine section having a plurality of turbine rotor disks rotated by the combustion gas supplied from the combustor and a plurality of turbine blade airfoils coupled to an outer surface of each of the plurality of turbine rotor disks, a turbine casing accommodating the turbine section, and a plurality of vane assemblies provided inside the turbine casing and arranged between the turbine blade airfoils, wherein each of the turbine vane assemblies comprises a vane airfoil configured to guide a flow direction of the combustion gas, a platform portion combined with an end of the vane airfoil, carrier hook portions provided at respective periphery portions of the platform portion and arranged to face the turbine casing so as to be fixed to the turbine casing, and a seal plate installed in a thermal stress prevention slot provided to the carrier hook portion facing the turbine casing, thereby preventing a portion of the compressed air supplied to the platform portion between the carrier hook portions by the compressor from leaking to an outside of the platform portion through the thermal stress prevention slot.

The vane assembly, the turbine, and the gas turbine according to the present disclosure are configured such that thermal stress prevention slots are provided in carrier hook portions provided at both periphery portions of a platform portion of the vane assembly, so that the carrier hook portions are hooked by a vane carrier of the turbine casing, thereby preventing concentration of thermal stress.

The seal plates are inserted into the thermal stress prevention slots, thereby preventing the compressed air from leaking through the thermal stress prevention slots. Thus, stable cooling of the turbine vane assembly can be achieved.

BRIEF DESCRIPTION OF THE DISCLOSURE

DETAILED DESCRIPTION OF THE DISCLOSURE

Hereinafter, a turbine according to one embodiment of the present disclosure will be described with reference to the accompanying drawings.

Figure 1:
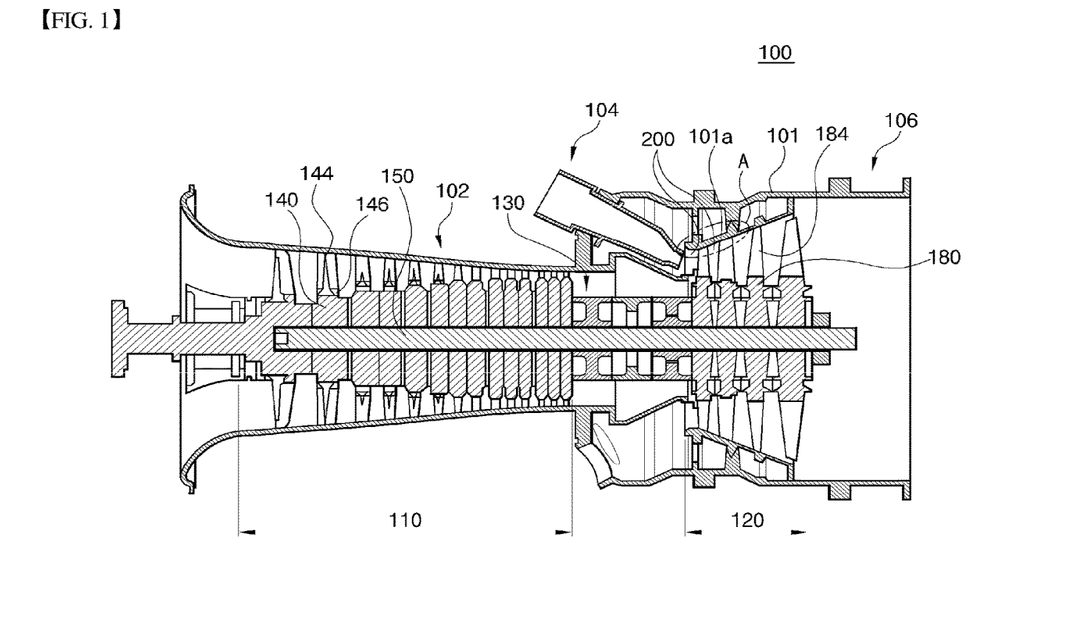
FIG. 1 is a cross-sectional view illustrating the schematic construction of a gas turbine comprising a turbine blade according to one embodiment of the present disclosure.

FIG. 1 illustrates a gas turbine 100 according to one embodiment of the present disclosure. The gas turbine 100 comprises a compressor casing 102 and a diffuser 106 disposed at the rear side of the compressor casing 102 and through which combustion gas having passed through the turbine is discharged to outside. A combustor 104 is arranged in front of the diffuser 106. The combustor 104 receives compressed air from the compressor section 110 of the compressor and performs combustion with the compressed air.

In terms of the direction of air flow, the compressor section 110 is disposed at the upstream side of the compressor casing 102, and a turbine section 120 is disposed at the downstream side of the compressor casing 102. A torque tube 130 for transmitting torque generated by the turbine section 120 to the compressor section 110 is provided between the compressor section 110 and the turbine section 120.

The compressor section 110 is provided with a plurality of (for example, 14) compressor rotor disks 140, and the compressor disks 140 are fastened by a tie rod 150 such as not to be separated from each other in the axial direction of the tie rod 150.

The compressor rotor discs 140 are arranged in the axial direction, and the tie rod 150 passes through the center holes of the compressor rotor discs 140. The compressor rotor discs 140 are combined by the tie rod 150 such that facing surfaces of adjacent compressor rotor discs 140 are pressed against each other not to perform relative rotation with respect to each other.

A plurality of compressor blade airfoils 144 are radially coupled to the external circumferential surface of the compressor rotor disk 140. Each of the compressor blade airfoils 144 has a root member 146 which is inserted into a corresponding slot formed in the outer circumferential surface of the compressor rotor disk 140. In this way, the compressor blade airfoils 144 are fastened to the compressor rotor disk 140.

Between each of the compressor rotor disks 140, vanes fixed to the compressor casing 102 are disposed. The compressor vanes are stationary members unlike the compressor disks 140. The compressor vanes regulate and guide the flow of compressed air having passed the compressor blade airfoils 144 of the upstream compressor rotor disks 140 such that the compressed air can flow to the compressor blade airfoils 144 of the downstream compressor rotor disk.

There are two types of coupling methods for the compressor blade root members 146. One is a tangential type and the other is an axial type. The type of coupling of the compressor blade root members 146 may be determined according to the structure of a gas turbine used. Typical compressor blades root members have a dove-tail structure or a fir-tree structure. Alternatively, the compressor blades may be coupled to the compressor rotor disk by means of different types of coupling tool, such as a key or a bolt.

The tie rod 150 is arranged to pass through the central holes of the plurality of compressor rotor disks 140, in which one end of the tie rod 150 may be coupled to the most upstream compressor rotor disk 140 and the other end may be fixed to the torque tube 130.

The shape of the tie rod 150 may vary according to the type of gas turbine. Therefore, it should be noted that the shape of the tie rod 150 is not limited to the exemplary shape illustrated in FIG. 1. For example, a single tie rod may be provided and installed to pass through all of the center holes of the rotor discs (e.g., single tie rod type). Alternatively, a plurality of tie rods may be arranged in a circumferential direction (e.g., multiple tie rod type). Further alternatively, a hybrid type in which the single tie rod type and the multiple tie rod type are combined may also be used.

As described above, a downstream side of the compressor section 110 of the compressor will be provided with vanes to control the inflow angle of the compressed fluid flowing into the combustor such that the actual inflow angle matches with the designed inflow angle. The vanes are collectively referred to as a deswirler.

The combustor 104 mixes the introduced compressed air with fuel and burns the air-fuel mixture to produce high-temperature high-pressure combustion gas. The combustion process is performed under constant pressure, and the temperature of the combustion gas is increased to the maximum heat-resistant temperature of the components of the combustor and the components of turbine.

A combustion system of the gas turbine is composed of a plurality of combustors 104. The combustors 104 are arranged in a casing and provided in the form of cells. Each combustor 104 comprises a burner having a fuel injection nozzle and the like, a combustor liner defining a combustion chamber, and a transition piece serving as a connector between the combustor and the turbine.

Particularly, the liner provides a combustion zone in which the fuel injected through the fuel nozzle and the compressed air supplied from the compressor are mixed and burnt. The liner encompasses a combustion space (e.g., combustion chamber) in which a fuel and air mixture is combusted, and comprises a flow sleeve that also encompasses the combustion chamber and provides an annulus space inside thereof. A fuel nozzle assembly is coupled to a front end (e.g., upstream end) of the liner, and a spark igniter plug is installed in the flank surface of the combustor.

A transition piece is connected to a rear end (e.g., downstream end) of the liner to deliver the combustion gas, which is produced in the combustion chamber, to the turbine. The outer surface of the transition piece is cooled by the compressed air supplied from the compressor. This cooling prevents the transition piece from being damaged by the high temperature combustion gas.

To this end, the transition piece is provided with cooling holes through which the compressed air is injected into the transition piece. The compressed air flows toward the liner after cooling the body portion of the transition piece.

The air used for cooling the transition piece flows through the annulus space of the liner. In addition, the compressed air externally introduced into the annular space through cooling holes formed in the flow sleeve may collide with the outer surface of the linear.

The high-temperature, high-pressure combustion gas ejected from the combustor 104 is introduced into the turbine 120. The supplied high-temperature, high-pressure combustion gas expands in the turbine and provides an impulse and reaction force to the blades of the turbine to generate a torque. The torque is transmitted to the compressor section 110 via the torque tube 130 described above. The excessive power exceeding the power required for driving the compressor is used to drive an electric generator or the like.

The turbine section 120 has a similar structure to the compressor section 110. That is, the turbine section 120 comprises a plurality of turbine rotor disks 180 similar to the compressor rotor disk 140 of the compressor section 120. Therefore, each of the turbine rotor disks 180 comprises a plurality of turbine blade airfoils 184 radially arranged. Each of the turbine blade airfoils 184 also may be fastened to the turbine rotor disk 180 in a dovetail coupling manner or the like. In addition, a plurality of vane assemblies 200 fixed to a turbine casing 101 of the turbine section 120 are provided between the turbine rotor disks 180 assembled with turbine blade airfoils 184, thereby guiding the flow direction of the combustion gas having passed the turbine blade airfoils 184.

Here, the vane assemblies 200 are arranged in a circumferential direction of the turbine casing 101. Preferably, the vane assemblies 200 are arranged to be alternate with the turbine blade airfoils 184 in the axial direction of the tie rod 150.

Figure 2:
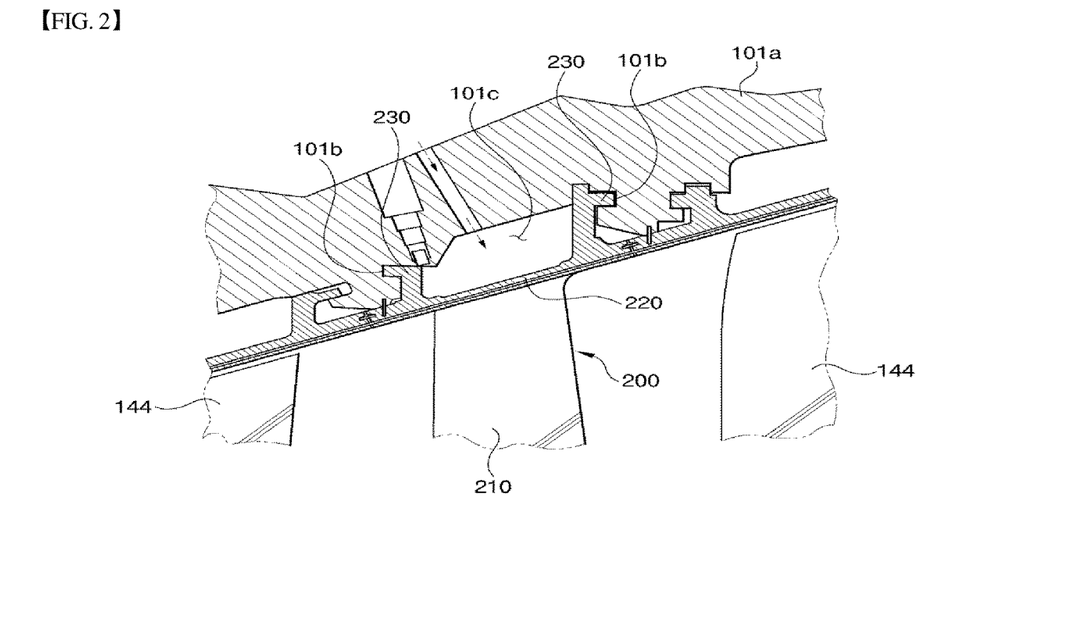
FIG. 2 is an expanded view of an "A" portion of FIG. 1.

Referring to FIG. 2, the vane assembly 200 is fixedly installed inside the turbine casing 101. More specifically, the vane assembly 200 is fixedly coupled to a turbine vane carrier 101a installed inside the turbine casing 101. The turbine vane carrier 101a has recessed portions 101b at a surface thereof facing an end of the vane assembly 200, that is a surface facing a platform portion 220 of the vane assembly 200 to be described later. Carrier hook portions 230 of the turbine vane carrier 101a will be inserted into the recessed portions 101b in a state in which the platform portion 220 of the vane assembly 200 is received in a corresponding slot. In addition, a cooling air receiving space 101c may be provided between the turbine vane carrier 101a and the platform portion 220 of the vane assembly 200 to receive compressed air from the compressor.

Figure 3:
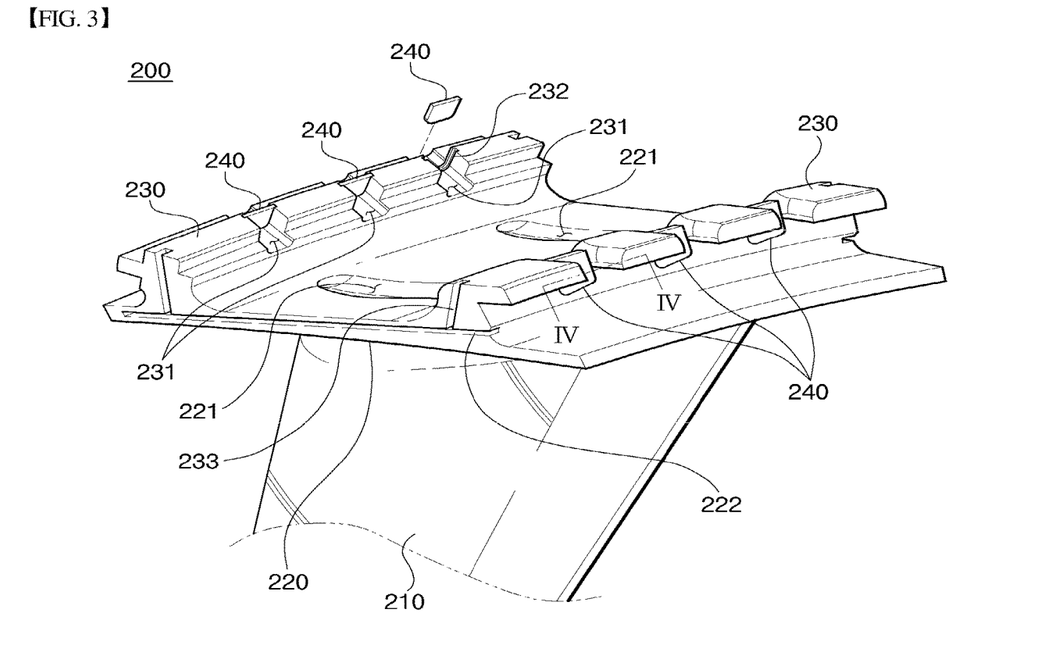
FIG. 3 is an expanded perspective view illustrating a vane assembly of FIG. 2.

Referring to FIG. 3, the vane assembly 200 comprises a vane airfoil 210 for guiding the flow of the combustion gas in a state where the vane assembly 200 is disposed inside the turbine casing 101 of the turbine section 120. The vane airfoil 210 has an airfoil having a leading edge disposed on the upstream side in terms of the flow direction of the combustion gas and a trailing edge disposed on the downstream side.

An air passage (not illustrated) is formed inside the vane airfoil 210. Thus, the compressed air supplied to the cooling air receiving space 101c can be introduced into and circulated in the vane airfoil 210.

The platform portion 220 is coupled to an end of the vane airfoil 210. The platform portion 220 has a flat plate shape and is inserted into the recessed portions 101b of the turbine vane carrier 101a. That is, the platform portions 220 of the vane assemblies 200 are inserted into the recessed portions 101b in corresponding slots of the turbine carrier 101a, thereby preventing the high-temperature combustion gas passing by the turbine airfoils 210 from leaking. An air supply hole 221 is formed in the platform portion 220 so as to be connected to the air passage (not illustrated) of the vane airfoil 210. A cooling channel 222 may be formed in the platform portion 220 so that the compressed air is introduced into the cooling channel 222 via carrier hook portions 230 to cool the platform portion 220.

At both sides of the upper surface of the platform portion 220, the carrier hook portions 230 are respectively formed. That is, the carrier hook portions 230 are respectively formed at opposite sides of the upper surface of the platform portion 220 so as to be positioned on the upstream side and the downstream side of the flow direction of the combustion gas, respectively. The carrier hook portions 230 are formed on both sides of the platform portion 220 in a manner of facing the inner surfaces of the turbine vane carrier 101a and of protruding in a Korean letter-'ㄱ' form (i.e., an inverted alphabetical letter-'L' shape) toward the turbine vane carrier 101a. Therefore, the platform portion 220 can be fixedly coupled to the turbine casing 101. The carrier hook portions 230 are engaged with and fixed in the recessed portions 101b of the turbine vane carrier 101a. Therefore, the vane airfoil 210 can be stably positioned when colliding with the combustion gas. In addition, the cooling channel connection hole 233 connected to the cooling channel 222 of the platform portion 220 is formed in the carrier hook portion 230.

A thermal stress prevention slots 231 are formed in the upper surface of the carrier hook portions 230, that is, the surface facing the inner surface of the turbine casing 101. As such, the thermal stress prevention slots 231 prevent thermal stress concentration at the carrier hook portions 230 that are fixedly coupled to the turbine vane carrier 101a. The carrier hook portions 230 will be pressed against the turbine vane carrier 101a by the load of the combustion gas applied to the vane airfoil 210, and the carrier hook portions 230 will thermally expand. At this time, the fastening between the carrier hook portions 230 and the turbine carrier 101a will be deteriorated. In other words, the thermal stress prevention slots 231 prevent deformation of the turbine vane carrier 101a attributable to concentration of thermal stress because a portion of the compressed air supplied onto the platform portion 220 between the carrier hook portions 230 flows in direct contact with the turbine vane carrier 101a, which is likely to cool a contact portion between the carrier hook portions 230 and the turbine vane carrier 101a. Here, the thermal stress prevention slot 231 is formed in a semicircular cross-sectional shape that is concave from the upper surface of the carrier hook portion 230. However, the present disclosure may not be limited thereto.

A seal insertion groove 232, which is formed in the thermal stress prevention slot 231 provided between the carrier hook portions 230 and a seal plate 240, is detachably mounted in the thermal stress prevention slot 231. The seal insertion groove 232 is formed to be recessed inward from the surface of the thermal stress prevention slot 231 so that the seal plate 240 can be inserted into and securely fixed in the thermal stress prevention slot 231. At this time, the seal insertion groove 232 is formed to be disposed at the longitudinal outer end of the thermal stress prevention slot 231, that is, at the rear end of the thermal stress prevention slot 231, in the direction of movement of the compressed air. Therefore, the cooling air can be sufficiently introduced into the thermal stress prevention slots 231, and thus the carrier hook portions 230 can be stably cooled. As shown in FIG. 3, the seal insertion groove 232 is formed to be disposed on upstream and downstream sides of the upstream and downstream thermal stress prevention slots 231, respectively.

Figure 4:
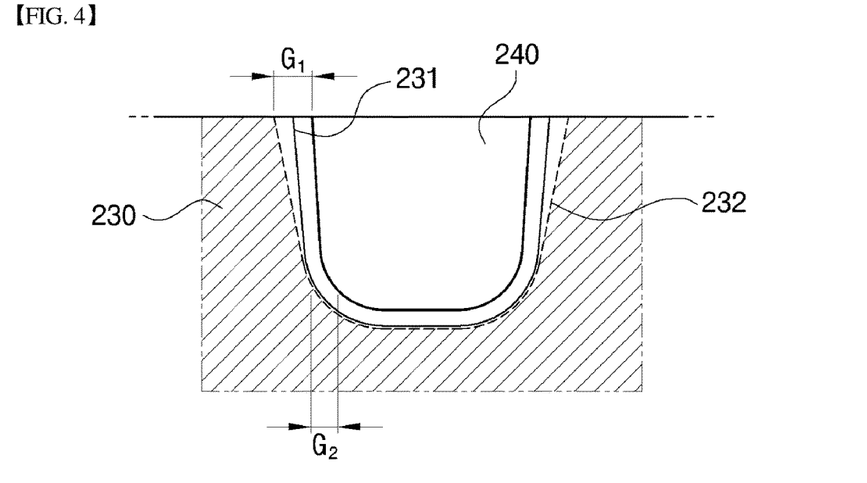
FIG. 4 is a cross-sectional view taken along line IV-IV of FIG. 3.

Referring to FIG. 4, the vertical cross-sectional size of the seal insertion groove 232 is formed to be larger than the vertical cross-sectional size of the thermal stress prevention slot 231 and the vertical cross-sectional size of the seal plate 240. Therefore, when the seal plate 240 is inserted into the seal insertion groove 232, a gap can be provided between the side surface of the carrier hook portion 230 and the side surface of the seal plate 240, thereby preventing concentration of thermal stress. Here, the size of the vertical cross-section of the seal insertion groove 232 may gradually increase from the upper end portion to the lower end portion thereof as compared with the size of the vertical cross-section of the thermal stress prevention slot 231. That is, an upper gap G1 which is a size difference between the vertical cross-section of the upper end portion of the seal insertion groove 232 and the vertical cross-section of the upper end portion of the thermal stress prevention slot 231 is larger than a lower gap G2 which is a size difference between the vertical cross-section of the lower end portion of the seal insertion groove 232 and the vertical cross-section of the lower end of the thermal stress prevention slot 231.

The seal plate 240 is a plate-shaped member for preventing the compressed air flowing into the thermal stress prevention slot 231 from leaking to outside of the platform portion 220. That is, the seal plate 240 prevents a portion of the compressed air supplied to the upper surface of the platform portion 220 between the carrier hook portions 230, that is, a portion of the cooling air supplied to the cooling air accommodation space portion 101*c*, from being leaked to the outside of the platform portion 220 through the thermal stress prevention 231, thereby enabling stable cooling of the carrier hook portions 230. The seal plates 240 are installed next to the carrier hook portions 230 in a side-to-side manner so as to be inserted into the respective thermal stress prevention slots 231. Since the seal plates 240 are installed in the respective thermal stress prevention slots 231, the seal plates 240 can prevent the compressed air introduced into the thermal stress prevention slots 231 from the cooling air accommodation space 101*c* from being leaked to outside. That is, the seal plates 240 prevent leakage of the compressed air through the thermal stress prevention slots 231 to outside of the carrier hook portions 230.

Preferably, the seal plate 240 may have a semicircular cross-sectional shape so as to block the movement of the compressed air moving along the thermal stress prevention slot 231 when it is in a state of being inserted into the seal insertion groove 232. However, the present disclosure is not limited thereto. The size of the vertical cross-section of the seal plate 240 is formed to be larger than the size of the vertical cross-section of the thermal stress prevention slot 231 but smaller than the size of the vertical cross-section of the seal insertion groove 232. Thus, when the seal plate 240 is inserted into the insertion groove 232, a gap is provided between the surface of the seal plate 240 and the surface of the seal insertion groove 232 (e.g., the surface of the carrier hook portion 230), thereby preventing concentration of thermal stress.

Figure 5:
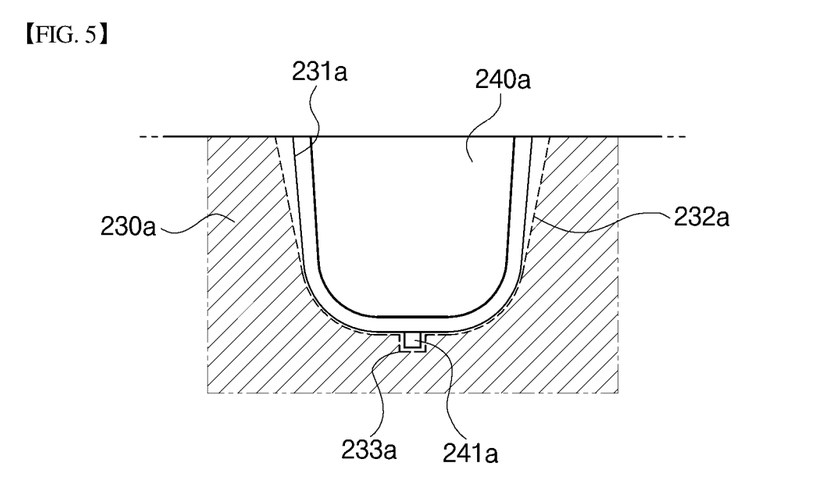
FIG. 5 is a cross-sectional view of an assembled structure of a carrier hook portion and a seal plate according to another embodiment of the present disclosure.

FIG. 5 is a cross-sectional view of an assembled state of a carrier hook portion 230*a* and a seal plate 240*a* according to another embodiment. Referring to FIG. 5, the outer edge of the seal plate 240*a*, (more specifically, the innermost portion of the outer edge of the seal plate 240*a*) is provided with a locking protrusion 241*a*. In addition, the seal insertion groove 232 is provided with a locking recess 233*a* at a corresponding position to the locking protrusion 241*a*. The locking recess 233*a* is formed to be recessed inward from the surface of the carrier hook portion 230. Although there is provided an example in which the seal plate 240*a* is provided with one locking protrusion 241*a*, the present disclosure is not limited thereto. The seal plate 240*a* may be provided with a plurality of locking protrusions 241*a* arranged at intervals. In this case, a plurality of locking recesses 233*a* may be correspondingly formed to engage with the locking protrusions 241*a*, respectively. When the seal plate 240*a* is inserted into the seal insertion groove 232*a*, the locking protrusion 241*a* is inserted into the locking recess 233*a*, which minimizes the movement of the seal plate 240*a* in the seal insertion groove 232*a*. That is, the position of the seal plate 240*a* can be stably maintained in the seal insertion groove 232*a*.

As described above, in the vane assembly, the turbine, and the gas turbine according to the present disclosure, the carrier hook portions 230 provided at both sides of the platform portion 220 of the vane assembly are provided with the thermal stress prevention slots 231. Thus, the carrier hook portions 230 can prevent concentration of thermal stress in a state of being fixed to the vane carrier 101*a* of the turbine casing 101.

In addition, since the seal plates 240 are inserted into the thermal stress prevention slots 231, it may be possible to prevent the compressed air from leaking through the thermal stress prevention slots 231. As a result, stable cooling of the vane assembly 200 can be achieved.

While the present disclosure has been described with reference to exemplary embodiments, those skilled in the art will appreciate that the exemplary embodiments are presented only for illustrative purposes and the present disclosure is not limited to the disclosed exemplary embodiments. On the contrary, it will be understood that various modifications and equivalents thereof are possible. Accordingly, the true technical protection scope of the present disclosure should be determined by the technical idea defined in the appended claims.

What is claimed is:

1. A vane assembly fixed to a turbine casing and configured to guide a flow direction of combustion gas having passed turbine blade airfoils, the vane assembly comprising:
   a vane airfoil configured to guide the flow direction of the combustion gas;
   a platform portion combined with an end of the vane airfoil;
   carrier hook portions formed at respective periphery portions of the platform portion so as to be fixed to the turbine casing, each of the carrier hook portions having a thermal stress prevention slot formed in a surface facing the turbine casing; and
   a seal plate installed on each of the carrier hook portions so as to be inserted into a corresponding thermal stress prevention slot, thereby preventing a portion of compressed air supplied to the platform portion between the carrier hook portions from leaking out of the platform portion through the thermal stress prevention slot, wherein each of the carrier hook portions further comprises a seal insertion groove that is formed in the thermal stress prevention slot of each of the carrier hook portions and formed to be recessed inward from a surface of each of the carrier hook portions, and wherein the seal plate of each of the carrier hook portions is installed to be inserted into a corresponding seal insertion groove and includes an outer periphery surface on which a locking protrusion is formed to correspond to a locking recess that is further recessed inward from the seal insertion groove of each of the carrier hook portions.

2. The vane assembly according to claim 1, wherein the thermal stress prevention slot of each of the carrier hook portions extends in a direction in which the combustion gas flows, and wherein the carrier hook portions include an upstream side carrier hook portion and a downstream side carrier hook portion, the upstream side carrier hook portion and the downstream side carrier hook portion disposed on the platform portion so as to face each other.

3. The vane assembly according to claim 1, wherein the seal insertion groove of each of the carrier hook portions is formed at a longitudinal outer end portion of the thermal stress prevention slot of each of the carrier hook portions.

4. The vane assembly according to claim 1, wherein a size of a vertical cross-section of the seal plate of each of the carrier hook portions is larger than a size of a vertical cross-section of the corresponding thermal stress prevention slot and smaller than a size of a vertical cross-section of the corresponding seal insertion groove.

5. The vane assembly according to claim 1, wherein the thermal stress prevention slot of each of the carrier hook portions is of a semicircular cross-sectional shape.

6. A turbine configured to generate driving force to be used for generation of electric power by allowing a combustion gas supplied from a combustor to pass therethrough, the turbine comprising:
a turbine section comprising a plurality of turbine rotor disks and a plurality of turbine blade airfoils coupled to an outer surface of each of the plurality of turbine rotor disks;
a turbine casing accommodating the turbine section; and
a plurality of vane assemblies provided inside the turbine casing and arranged between the turbine blade airfoils,
wherein each of the turbine vane assemblies comprises
a vane airfoil configured to guide a flow direction of the combustion gas,
a platform portion combined with an end of the vane airfoil,
carrier hook portions formed at respective periphery portions of the platform portion so as to be fixed to the turbine casing, each of the carrier hook portions having a thermal stress prevention slot formed in a surface facing the turbine casing; and
a seal plate installed on each of the carrier hook portions so as to be inserted into a corresponding thermal stress prevention slot, thereby preventing a portion of compressed air supplied to the platform portion between the carrier hook portions from leaking out of the platform portion through the thermal stress prevention slot,
wherein each of the carrier hook portions further comprises a seal insertion groove that is formed in the thermal stress prevention slot of each of the carrier hook portions and formed to be recessed inward from a surface of each of the carrier hook portions, and wherein the seal plate of each of the carrier hook portions is installed to be inserted into a corresponding seal insertion groove and includes an outer periphery surface on which a locking protrusion is formed to correspond to a locking recess that is further recessed inward from the seal insertion groove of each of the carrier hook portions.

7. The turbine according to claim 6,
wherein the thermal stress prevention slot of each of the carrier hook portions extends in a direction in which the combustion gas flows, and wherein the carrier hook portions include an upstream side carrier hook portion and a downstream side carrier hook portion, the upstream side carrier hook portion and the downstream side carrier hook portion disposed on the platform portion so as to face each other.

8. The turbine according to claim 6, wherein the seal insertion groove of each of the carrier hook portions is formed at an exit end of the thermal stress prevention slot of each of the carrier hook portions.

9. The turbine according to claim 6, wherein a size of a vertical cross-section of the seal plate of each of the carrier hook portions is larger than a size of a vertical cross-section of the corresponding thermal stress prevention slot and smaller than a size of a vertical cross-section of the corresponding seal insertion groove.

10. The turbine assembly according to claim 6, wherein the thermal stress prevention slot of each of the carrier hook portions has a semicircular cross-sectional shape.

11. A gas turbine comprising:
a compressor taking in air and compressing the intake air;
a combustor burning fuel by using compressed air supplied from the compressor to produce combustion gas; and
a turbine comprising
a turbine section having a plurality of turbine rotor disks rotated by the combustion gas supplied from the combustor and a plurality of turbine blade airfoils coupled to an outer surface of each of the plurality of turbine rotor disks,
a turbine casing accommodating the turbine section, and
a plurality of vane assemblies provided inside the turbine casing and arranged between the turbine blade airfoils,
wherein each of the turbine vane assemblies comprises
a vane airfoil configured to guide a flow direction of the combustion gas,
carrier hook portions formed at respective periphery portions of the platform portion so as to be fixed to the turbine casing, each of the carrier hook portions having a thermal stress prevention slot formed in a surface facing the turbine casing; and
a seal plate installed on each of the carrier hook portions so as to be inserted into a corresponding thermal stress prevention slot, thereby preventing a portion of compressed air supplied to the platform portion between the carrier hook portions from leaking out of the platform portion through the thermal stress prevention slot,
wherein each of the carrier hook portions further comprises a seal insertion groove that is formed in the thermal stress prevention slot of each of the carrier hook portions and formed to be recessed inward from a surface of each of the carrier hook portions, and wherein the seal plate of each of the carrier hook portions is installed to be inserted into a corresponding seal insertion groove and includes an outer periphery surface on which a locking protrusion is formed to correspond to a locking recess that is further recessed inward from the seal insertion groove of each of the carrier hook portions.

12. The gas turbine according to claim 11, wherein the thermal stress prevention slot of each of the carrier hook portions extends in a direction in which the combustion gas flows, and wherein the carrier hook portions include an upstream side carrier hook portion and a downstream side carrier hook portion, the upstream side carrier hook portion and the downstream side carrier hook portion disposed on the platform portion so as to face each other.

13. The gas turbine according to claim 11, wherein the seal insertion groove of each of the carrier hook portions is formed at an exit end of the thermal stress prevention slot of each of the carrier hook portions.

14. The gas turbine according to claim 11, wherein a size of a vertical cross-section of the seal plate of each of the carrier hook portions is larger than a size of a vertical cross-section of the corresponding thermal stress prevention slot and smaller than a size of a vertical cross-section of the corresponding seal insertion groove.

\* \* \* \* \*